United States Patent
Szydlo et al.

(10) Patent No.: US 6,174,745 B1
(45) Date of Patent: *Jan. 16, 2001

(54) METHOD FOR MAKING A TFT ACTIVE MATRIX FOR A PROTECTION SYSTEM SCREEN

(75) Inventors: Nicolas Szydlo; François Templier; Jean-Michel Vignolle, all of Paris (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/930,843
(22) PCT Filed: Apr. 5, 1996
(86) PCT No.: PCT/FR96/00521
    § 371 Date: Dec. 12, 1997
    § 102(e) Date: Dec. 12, 1997
(87) PCT Pub. No.: WO96/31799
    PCT Pub. Date: Oct. 10, 1996

(30) Foreign Application Priority Data

Apr. 7, 1995 (FR) .................................................. 95 04187

(51) Int. Cl.[7] ........................ H01L 21/00; H01L 21/3205
(52) U.S. Cl. .............................................. 438/30; 438/586
(58) Field of Search ................................ 216/2; 438/689, 438/571, 586, 30, 597, 703, 720; 349/111; 257/66

(56) References Cited

U.S. PATENT DOCUMENTS

| | | | | |
|---|---|---|---|---|
| 4,687,298 | * | 8/1987 | Aoki et al. | 349/111 |
| 5,432,625 | * | 7/1995 | Morin et al. | 349/111 |
| 5,466,617 | * | 11/1995 | Shannon | 438/30 |
| 5,728,592 | * | 3/1998 | Oki et al. | 438/30 |
| 5,796,116 | * | 8/1998 | Nakata et al. | 257/66 |
| 5,821,133 | * | 10/1998 | Kawai et al. | 438/30 |
| 5,830,785 | * | 11/1998 | Sanson et al. | 438/30 |

* cited by examiner

*Primary Examiner*—Nam Nguyen
*Assistant Examiner*—Gregg Cantelmo
(74) *Attorney, Agent, or Firm*—John C. Fox; Norman N. Spain

(57) ABSTRACT

A method is provided for manufacturing, in four masking steps, an active matrix for a liquid crystal display screen whose control transistors are of the top-gate type. The liquid crystal display screen obtained by means of this method is particularly suitable for use in image projection systems. The method comprises the steps of:

depositing and etching a first opaque layer on a transparent insulating plate;

depositing an insulating transparent layer;

depositing and etching a transparent conductor;

selectively depositing an ohmic contact and subsequently depositing an intrinsic semiconductor material and a gate insulating material, and first etching of the assembly, depositing and etching an opaque conducting layer, and etching of the semiconductor layer and gate insulating layer by using as a mask the etched opaque conducting layer.

13 Claims, 3 Drawing Sheets

METHOD FOR MAKING A TFT ACTIVE MATRIX FOR A PROTECTION SYSTEM SCREEN

BACKGROUND OF THE INVENTION

The invention relates to a method of manufacturing, in four masking steps, an active matrix for a liquid crystal display screen whose control transistors are of the top-gate type. The liquid crystal display screen obtained by means of this method is particularly suitable for use in image projection systems.

Direct-vision or projection liquid crystal display screens are generally composed of rows (selection rows) and columns (data rows), with the pixel electrodes connected to these rows via transistors situated at their intersections. The gates of these transistors constitute the selection rows and are controlled by peripheral control circuits which scan the rows and turn on the transistors of each row in that the electrodes are biased by means of the data rows connected to the other peripheral control circuits, and the optical properties of the liquid crystal between these electrodes and the counter electrode (or the reference electrode) are modified so that images are formed on the screen.

OBJECTS AND SUMMARY OF THE INVENTION

The liquid crystal display screens used in projection systems are subject to considerable stresses because of the power of the required white light beam which may range as high as 300 mW/cm$^2$. In the relevant case, in which the active matrix is constituted by top-gate thin-film transistors, it is necessary that, if these transistors are to withstand these stresses, the photoconducting silicon is protected from the beam by an opaque mask and has a storage capacity which is parallel with the capacity of the liquid crystal of the elementary pixel.

However, in such liquid crystal display screens which are suitable for projection systems, there are still serious drawbacks such as the strong resistance of the ITO columns or the risks of ITO fracture.

It is an object of the invention to provide a simple and reliable method, comprising only 4 masking steps, of manufacturing an active thin-film transistor (TFT) matrix in amorphous silicon a-Si in a direct step, taking the above-mentioned stresses into account and remedying the drawbacks of the existing solutions.

To this end, the invention relates to a method of manufacturing active matrix screens constituted by pixels controlled by transistors whose sources and drains constitute a column or a pixel electrode and the gate constitutes a selection row, and is wherein said method comprises the steps of:

depositing and etching a first opaque layer on a transparent insulating plate so as to mask the semiconductor layer from the transistor to be realized; this first layer preferably being conducting so as to realize a single storage capacity, and being etched so as to realize a grid to be biased by external circuits;

depositing an insulating transparent layer; on said grid depositing and etching a transparent conducting layer on said insulating layer so as to realize pixel electrodes, sources and drains and external output tracks;

forming doped regions on the sources and drains to form ohmic contact, subsequently depositing an intrinsic semiconductor material and a gate insulating material, and etching of the resultant assembly in such a way that the external tracks of the active matrix are not covered;

depositing an opaque conducting layer on said resultant etched assembly and etching said layer; realizing the rows of the active matrix as well as the gates of the transistors, and then etching the semiconductor etched layer and gate insulating layer by using the opaque conducting layer as a mask.

An opaque mask masking the semiconducting parts of the active matrix is preferably etched on the counter electrode.

This method is improved in that, in the first step of etching the combination of semiconductor layer and gate insulating layer, apertures are provided in this combined layer so as to establish contacts between the transparent conducting layer and the opaque conducting layer.

A supplementary step may be added, which consists of passivating the assembly by depositing an insulating layer through, for example, a metallic mask, thus passing only beyond the contacts required for controlling the active matrix.

The invention also relates to a flat screen obtained by means of this method.

The present invention will be better understood and additional advantages will be apparent from reading the following description illustrated by means of the following Figures:

DESCRIPTION OF THE PREFERRED EMBODIMENTS

Figure 1A:
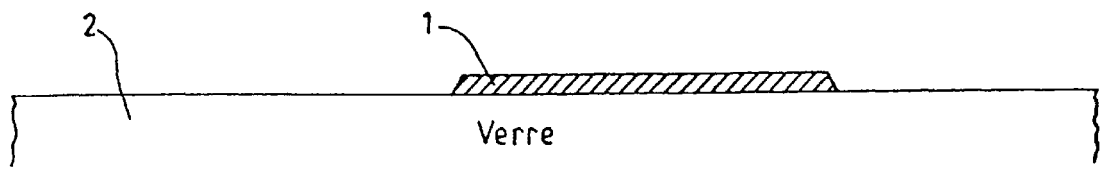
FIGS. 1a to 1d illustrate an embodiment of the method of invention.

As is shown in FIG. 1a, the first and second steps of manufacturing the top gate TFT according to the invention consist of depositing and subsequent etching of an opaque layer 1 (first masking step), for example a metallic layer of titanium Ti or chromium Cr in a thickness of the order of 100 to 200 nm by means of cathode sputtering on the transparent substrate 2 which may consist of glass. The function of this opaque layer is to mask the semiconducting part of the transistor from the incident light of the projection system but also to serve as a connection to the storage capacity formed by the pixel electrode and this opaque layer, provided that this layer is conducting. The grid which is then obtained constitutes an opaque earth plane and may be biased via peripheral tracks. To improve this storage capacity, a transparent conducting layer may be deposited, in an intermediate step, on the assembly of the substrate before or after the opaque layer 1.

Figure 2A:
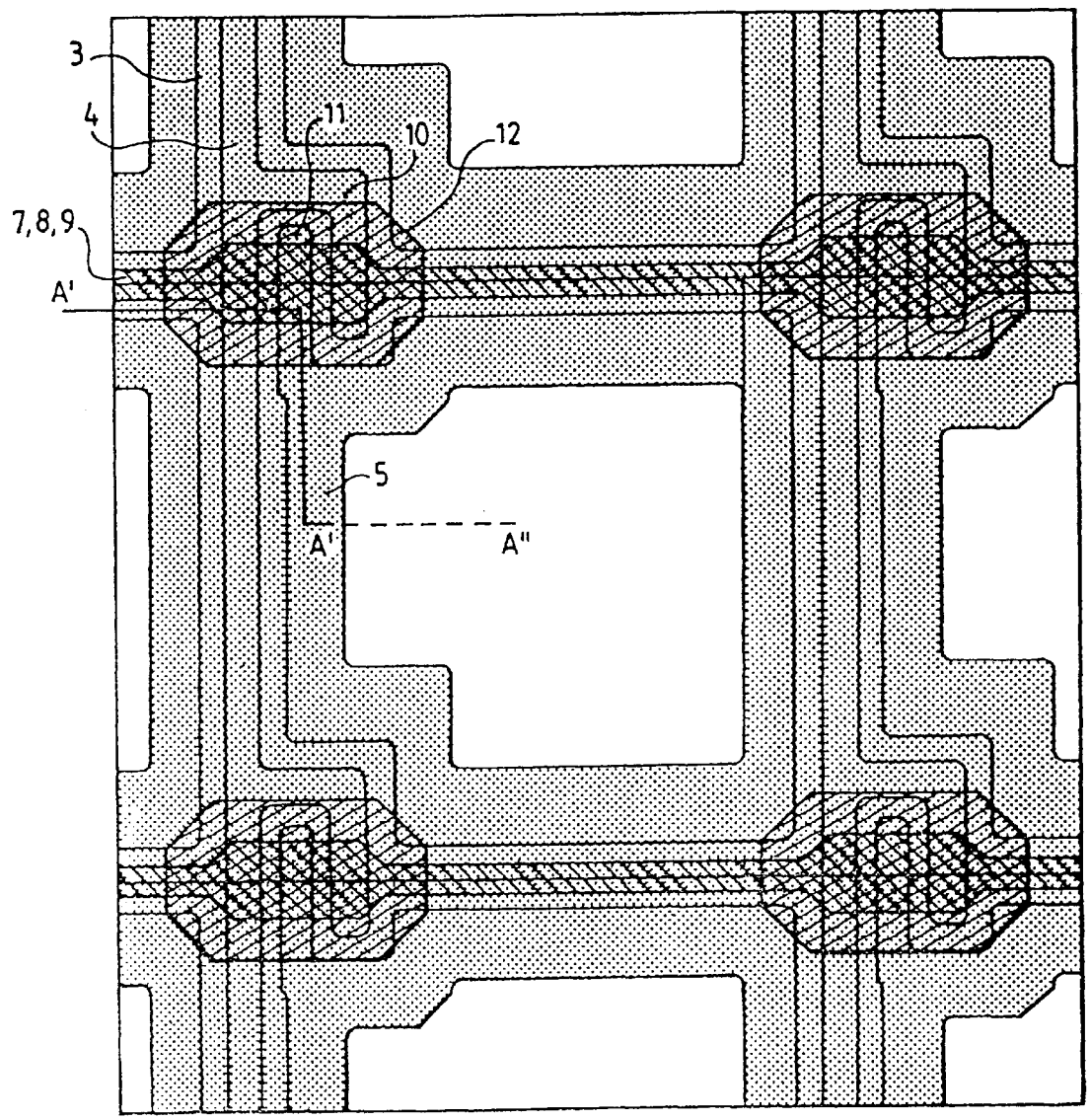
FIG. 2a is a plan view of a pixel obtained by means of the method described with reference to the previous Figure.
Figure 2B:
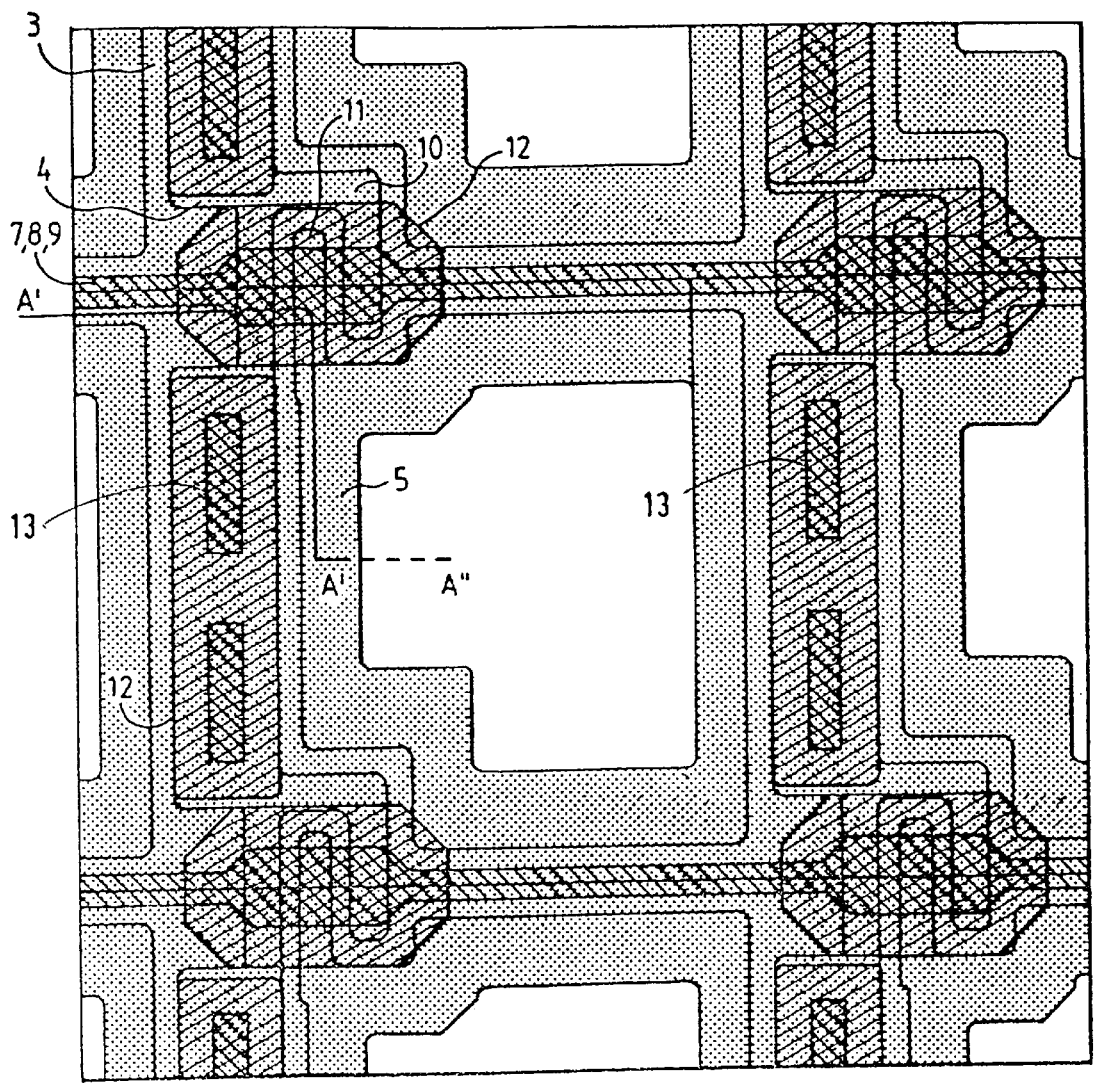
FIG. 2b is a plan view of a pixel obtained by means of a method according to the invention, using redundance.

In a third manufacturing step, shown in FIG. 2b, a layer 3 of a transparent insulating material (silicon SiO$_2$ or a dielectric equivalent) is deposited and covers the assembly of the conducting opaque grid formed in the previous step. This layer insulates the storage capacity mentioned above. Only the extremities of the tracks of the conducting layer 1 are not covered in the case where this grid is to be biased. This deposition step may be carried out by means of chemical plasma vapor deposition (PECVD) or vapor deposition under atmospheric pressure (APCVD) in a thickness of the order of 0.5 to 1 μm.

The fourth and fifth steps of the manufacturing method according to the invention consist of depositing and subsequent etching of a transparent conducting layer of, for example ITO (Indium Tin Oxide) on this insulating layer 3, by means of cathode sputtering in a thickness of the order of 1500 to 2500 Å. The resistance per square should be as small as possible. This layer must be etched so as to form the source columns 4, the pixel drain electrodes 5 and the output tracks 6 for the external connections of the active matrix. This step necessitates a second masking step for photoetching.

Figure 1B:
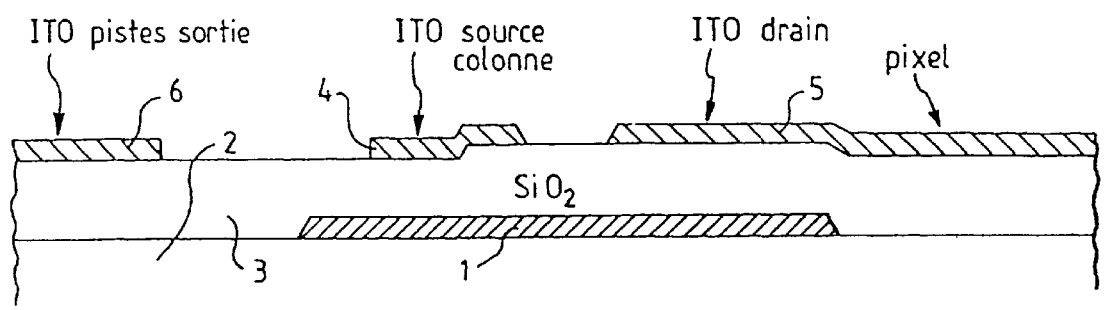
Figure 1C:
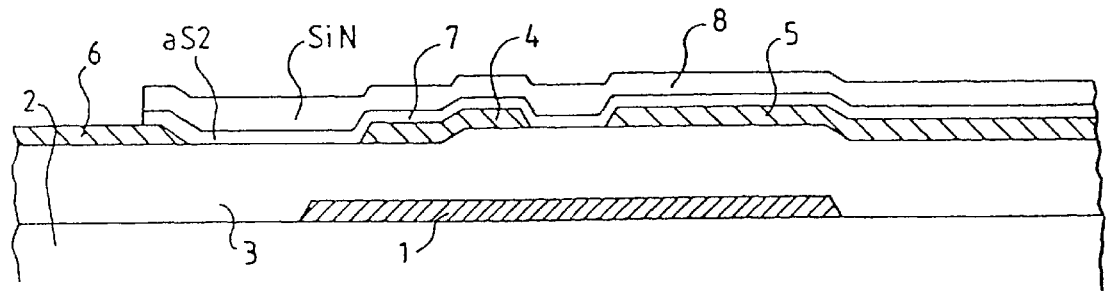

The sixth step is shown in FIG. 1c and consists of depositing three layers. The first layer creates the ohmic source-drain contact by means of a phosphor ion (P+) bombardment from a plasma flash of, for example PH3. The second deposited layer is the semiconductor layer 7, for example of amorphous silicon a-Si in a thickness of the order of 500 Å, and the third layer is the insulating layer 8 of, for example silicon nitride SiN in a thickness of the order of 2000 to 3000 Å. These three layers may be deposited in the same PECVD step at a maximum temperature of the order of 200 to 250° C. so that it does not degrade the ITO surface.

In a seventh step, this triple layer is etched (third masking step) so as to form the apertures (vias) for access to the output tracks and to the columns in the case of a redundance option, i.e. in the case of formation of contact between the ITO layers 4, 5 and 6 and a metal layer 9 to be formed. This step is carried out by means of reactive ion etching (RIE, Reactive Ion Etching) for obtaining a gradual slope of apertures (vias).

Figure 1D:
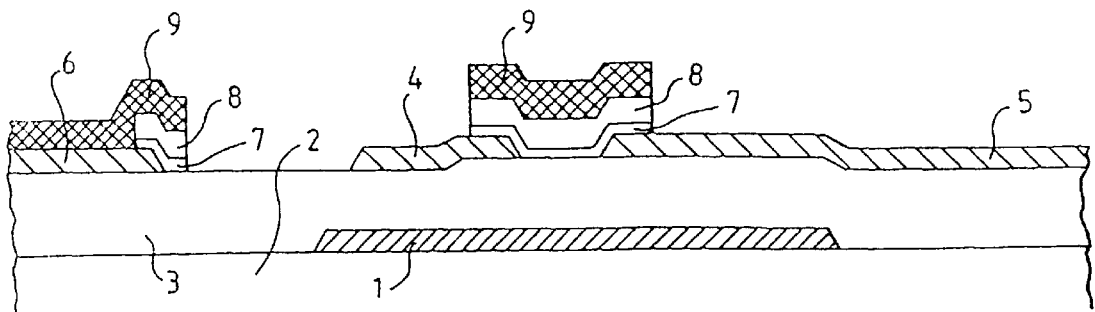

The eighth step of the method is shown in FIG. 1d and consists of depositing a conducting layer 9 of, for example aluminum Al, molybdenum Mo, or chromium Cr by cathode sputtering in a thickness of the order of 2000 to 4000 Å. In a ninth step of the method, the conducting layer 9 is subjected to a photolithographic step (fourth masking step) and a subsequent etching step for forming the rows of the matrix and the gates of the transistor.

This conducting layer may remain or not remain in contact with the ITO of the output tracks in accordance with the chosen address type. It may also be in contact with a part of the ITO rows when the redundance option is chosen.

The ninth step consists of etching the triple layer consisting of the ohmic contact layer, the semiconductor layer 7 and the insulating layer 8 by using the conducting layer 9 as a mask, while the resin on this layer may be covered, preferably by means of dry-etching (RIE).

Finally, the tenth step consists of coating the assembly with an insulating layer (not shown in the Figure) of, for example SiN or SiO in a thickness of between 2000 and 5000 Å. This last layer, which is not photolitho-etched, is not required but it ensures the absence of possible short-circuits between the pixels or the rows and the counter electrode. It may be photolitho-etched or not. In this case and in this type of technology, the access to the TFT region is established by means of polyimide etching and passivating SiN when the cell is assembled, filled with liquid crystals and sealed, in which the counter electrode serves as a mask.

In FIGS. 2a and 2b, which are plan views of a pixel obtained by means of the embodiments of the method according to the invention, the references corresponding to the different material layers in FIGS. 1a to 1d are used again. FIG. 1d is taken on a line AA'A" in FIGS. 2a and 2b. An opaque mask 12 of an orthogonal shape is etched on the counter electrode so as to mask only the semiconducting parts of the control transistor from the light coming from the side of the counter electrode. It may also have a round or any other shape. The column 3 has a lug 10 around the strip 11 of the electrode 5, constituting the drain of the transistor and improving its effectiveness. For the sake of clarity, this lug is not shown in FIGS. 1a to 1d, while the output tracks 6 of FIGS. 1b to 1d are not shown in FIGS. 2a and 2b. The rows are realized by the stack of layers consisting of the semiconductor layer 7, the gate insulating layer 8 and the metal layer 9.

FIG. 2b is equivalent to FIG. 2, except that it shows the redundance option which consists of etching an aperture 13 (vias) in the semiconductor layer 7 and the gate insulating layer 8 in the seventh step of the method in order to contact the ITO layer 4 with the metal layer 9. This contact provides the double advantage of a reduction of the column resistivity (the resistivity of ITO is higher than the resistivity of molybdenum or aluminum) and of ensuring the continuity of the column 4 when the ITO is fractured between two apertures (vias).

The invention is applicable to any liquid crystal display screen whose active matrix is constituted by transistors of the top-gate type, but particularly to screens used in image projection systems.

What is claimed is:

1. A method of manufacturing active matrix screens constituted by pixels controlled by transistors whose sources and drains constitute a column or a pixel electrode, and gates constitutes a selection row, said method comprising the steps of:

depositing and etching an opaque layer (1) on a transparent insulating plate (2) so as to mask a semiconductor layer (7) of transistors to be formed;

depositing an insulating transparent layer (3) on said etched opaque layer (1);

depositing and etching a transparent conducting layer on said insulating transparent layer (3) so as to form source columns (4), pixel drain electrodes (5) and output tracks (6);

depositing doped regions on the source columns (4) and the pixel drain electrodes (5) to form source and drain ohmic contacts;

depositing a layer (7) of an intrinsic semiconductor material on the layer (3) provided with said source and drain ohmic contacts;

depositing a layer (8) of a gate insulating material on said layer (7) of an intrinsic semiconductor material to thereby form the transistors;

first etching the resultant deposited layers of the gate insulating material and of the intrinsic semiconductor material and the doped regions so as to uncover the output tracks (6) of the active matrix and the gates of the transistors;

depositing an opaque conducting layer (9) on the etched layer (8) of the gate insulating material and etching said deposited opaque conducting layer (9) and then further etching the etched deposited layers of the gate insulating material and of the intrinsic semiconductor material using the etched opaque conducting layer (9) as a mask to thereby form rows of the matrix and gates of the transistors.

2. A method as claimed in claim 1, wherein an opaque mask (12) masking semiconducting parts of the active matrix is etched on a counter electrode.

3. A method as claimed in claim 1, wherein the opaque layer (1) is conducting so as to form a storage capacity.

4. A method as claimed in claim 3, wherein said opaque layer (1) is etched so as to form a grid to be biased by external circuits.

5. A method as claimed in claim 3, wherein an additional transparent conducting layer is deposited before or after the opaque layer (1).

6. A method as claimed in claim 1, wherein during the first etching of the combination of semiconductor layer (7) and gate insulating layer (8), apertures are provided in said combined layer so as to establish contacts between the transparent conducting layer and the opaque conducting layer (9).

7. A method as claimed in claim 1, wherein the opaque layer (1) consists of titanium, chromium, molybdenum or aluminum in a thickness of between 100 and 200 nm.

8. A method as claimed in claim 1, wherein the insulating transparent layer (3) consists of silicon oxide or silicon nitride in a thickness of between 0.5 and 1 µm.

9. A method as claimed in claim 1, wherein the transparent conducting layer is indium tin oxide in a thickness of between 1500 and 2500 Å.

10. A method as claimed in claim 1, wherein the opaque conducting layer (9) is a metal selected from the group consisting of molybdenum, aluminum, titanium and chromium in a thickness of about 2000 to 4000 Å.

11. A method as claimed in claim 1 wherein an additional step of passivating the active matrix screens by depositing an insulating layer passing beyond contacts required for controlling the active matrix is employed.

12. A method as claimed in claim 1 wherein said intrinsic semiconductor material of layer (7) consists of amorphous silicon in a thickness of about 500 Å.

13. A method as claimed in claim 1 wherein said gate insulating material of layer (8) consists of silicon nitride or silicon oxide in a thickness of about 2000 to 4000 Å.

* * * * *